Feb. 12, 1924.
L. C. KARCHER
1,483,096
REVERSE BRAKE CONTROL FOR AUTOMOBILES
Filed Sept. 21, 1920
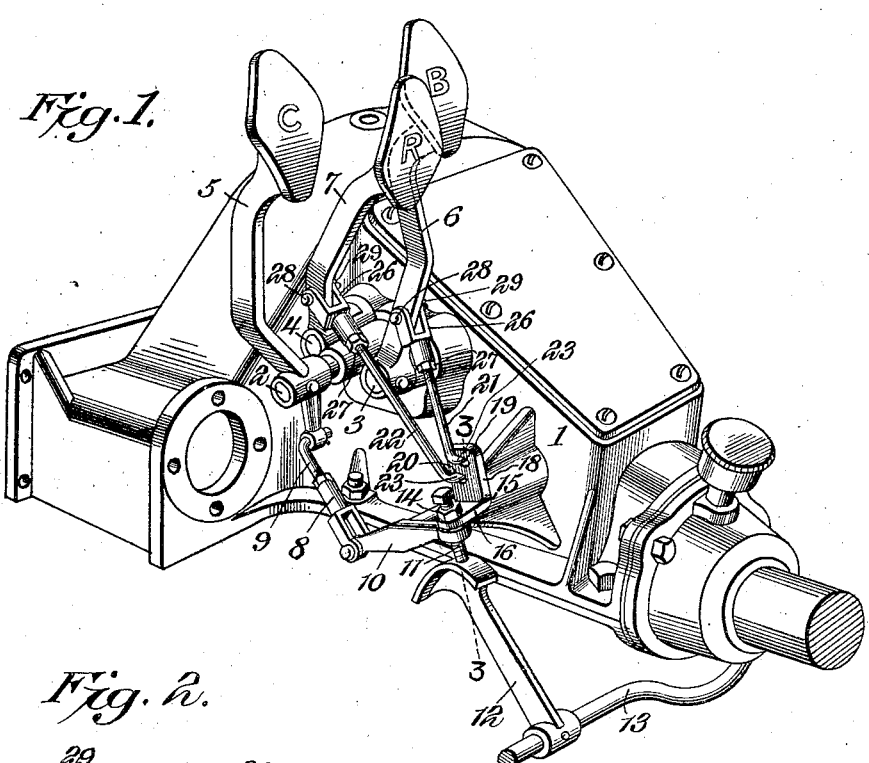
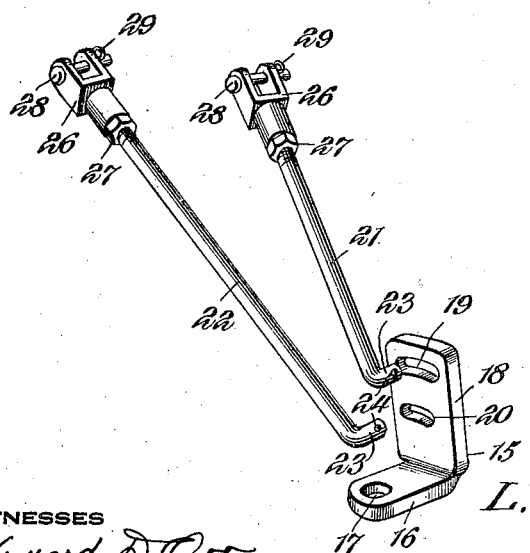
WITNESSES
Howard D. Orr
F. T. Chapman
L. C. Karcher, INVENTOR,
BY E. G. Siggers
ATTORNEY Patented Feb. 12, 1924.

1,483,096

UNITED STATES PATENT OFFICE.

LAWRENCE CHARLES KARCHER, OF HENDERSON, KENTUCKY, ASSIGNOR TO THE KARCHER COMPANY, OF WILMINGTON, DELAWARE, A CORPORATION OF DELAWARE.

REVERSE BRAKE CONTROL FOR AUTOMOBILES.

Application filed September 21, 1920. Serial No. 411,743.

*To all whom it may concern:*

Be it known that I, LAWRENCE C. KARCHER, a citizen of the United States, residing at Henderson, in the county of Henderson and State of Kentucky, have invented a new and useful Reverse Brake Control for Automobiles, of which the following is a specification.

This invention has reference to reverse and brake control attachments for automobiles, and is designed more particularly for attachment to the type of automobile known as the "Ford". The Ford automobile is provided with three control pedals, one intended for controlling the high and low speed drive and known as the clutch pedal, and the other two pedals controlling the reverse and brake, respectively. Oftentimes even experienced operators will apply the brakes and the reverse at the same time to the detriment of the controlling structure, for then heavy strains are put upon the bands used to engage the respective drums. With inexperienced operators, the bands controlling the reverse and the brakes are applied simultaneously, to the detriment of the bands, and wearing such bands very rapidly.

In order to prevent the reverse pedal and the clutch pedal from being simultaneously operated, the invention contemplates the provision of two rods, one connected to the brake pedal lever and the other connected to the reverse pedal lever, and both coupled by means of a suitable bracket to the clutch lever screw and slow speed connection to the clutch pedal.

The arrangement is such that when either the brake pedal or the reverse pedal is operated, the clutch lever is actuated to the neutral position, and consequently the clutch is thrown out of action whenever the brake or the reverse is put into action so that it is impossible to have either the brake or the reverse in operation at the same time with each other or with the clutch.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a perspective view of the transmission case of a Ford automobile, showing the invention applied.

Fig. 2 is a perspective view of the elements comprising the invention, but omitting the parts to which these elements are secured.

Fig. 3 is a section on the line 3—3 of Fig. 1, but drawn on a larger scale.

Referring to the drawing, there is shown a transmission case 1, which need not be described in detail since it does not form a part of the invention, nor is it necessary to describe the transmission enclosed by the transmission case cover.

Mounted on the transmission case and extending into the interior thereof are rock shafts 2, 3 and 4, respectively, each operated by a respective pedal lever 5, 6 and 7, constituting the clutch, brake and reverse levers of the automobile and constructed in the ordinary manner well known in the case of Ford automobiles.

Connected to an arm on the lever 5 is a clevis 8 attached by means of a slow speed connection 9, to a clutch lever 10 carrying a set screw 11, engaging another lever 12 on a rock shaft 13 connected to and actuating the wheel brakes of the automobile.

Connected to the lever 10, by the screw 11 and held in place by the customary lock nut 14, is a bracket 15 indicated as a right angle bracket, with one leg 16 provided with a perforation or passage 17 for the screw 11, while the other arm 18 of the bracket 15 is provided with spaced slots 19, 20 each slighty curved about a common axis.

There are also provided two rods or bars 21, 22 each with one end 23 bent at substantially right angles to enter a respective one of the slots 19 and 20, and these ends 23 are each perforated as indicated at 24 to receive a cotter pin 25 or other suitable fastening device holding the rod 21 or 22, as the case may be, against the bracket arm 18, with the ends 23 passed through the slots 19 and 20. At the other end of each rod or bar 21 and 22 there is applied a clevis 26 with a lock nut 27 and traversed by a pin 28 held to the respective clevis by a cotter pin 29 or other suitable arrangement. The two rods 21 and 22 are of different lengths so as to accommodate the different relations of the pedal levers 6 and 7 with respect to the bracket 15.

In installing the attachment, it is necessary to bore a hole through each pedal lever 6 and 7, so that the clevis 26 may be attached to the respective lever 6 or 7 by means of the connecting pin 28 and cotter pin 29.

The attachment does not in any way interfere with the ordinary running of the vehicle or the operation of the clutch pedal in either the high or the low position. When, however, it becomes necessary to apply the foot brake, pressure upon the brake pedal causes a rocking of the brake lever 6 in a direction to act through the rod 21 and bracket 15 to in turn rock the lever 10 and move the clutch pedal and parts controlled thereby to the neutral position, at the same time applying the foot brake. Under these circumstances, the clutch is automatically moved into neutral position as the foot brake is moved into active position, thus applying the foot brake without any strains whatever upon the clutch mechanism and permitting the stopping of the progress of the vehicle without causing any load to be imposed upon the engine. In like manner, the reverse pedal, when moved toward the active position, has a like effect through the bracket 15 upon the clutch mechanism, thus throwing the clutch into the neutral position whenever the reverse pedal is operated, so that even though the engine be initially in the clutched position, the attempt to reverse the direction of movement of the vehicle will not cause strains to be put upon the engine by inefficiency or forgetfulness on the part of the operator. The attachment, therefore, prevents harmful effects upon the engine when the operator unintentionally attempts to apply the foot brake without first placing the clutch into neutral or attempts to apply the reverse when the clutch is set in the forward driving position. It follows, therefore, that extraordinary wear and rapid deterioration cannot occur.

What is claimed is:—

1. An attachment for automobiles for preventing the application of either the brake or the reverse mechanism while the forward or high speed clutch is in action, comprising a bracket for attachment to the clutch lever, and a pair of connecting rods leading from the bracket to the brake and reverse levers of the automobile, whereby on the application of either the brake or the reverse mechanism the clutch is moved into the neutral or out-of-action position.

2. An attachment for automobiles for preventing the application of either the brake or the reverse mechanism while the forward or high speed clutch is in action, comprising a bracket for attachment by the clutch lever screw of the automobile to the clutch lever, and said bracket having a pair of slots therein, and a pair of rods each with one end bent to engage one of the slots of the bracket and the other end provided with means for attachment to the brake lever and reverse lever respectively.

3. In an automobile provided with clutch mechanism, a foot brake lever and a reverse lever, the combination with the brake lever and reverse lever, of a rod connected to the brake lever, another rod connected to the reverse lever, and a bracket constructed to be engaged by both rods and to in turn be secured to the clutch lever of the automobile.

4. In an automobile provided with a clutch pedal, a brake pedal, a reverse pedal, a clutch lever, and means for connecting the clutch pedal to the clutch lever, the combination therewith of a bracket mounted on the clutch lever and provided with a pair of slots, a pair of rods of different lengths, one rod being connected to the brake pedal and the other to the reverse pedal, and said rods engaging a respective one of the slots of the bracket, and means for connecting the clutch lever to the actuating devices for the wheel brakes of the automobile.

In testimony that I claim the foregoing as my own, I have hereto affixed my signature.

LAWRENCE CHARLES KARCHER.